(12) United States Patent
Hsieh

(10) Patent No.: US 8,833,244 B2
(45) Date of Patent: Sep. 16, 2014

(54) CONVEYING FRYING MACHINE

(75) Inventor: Mu-Lin Hsieh, Kaohsiung (TW)

(73) Assignee: Chuan Yang Foods Machine Co., Ltd., Kaohsiung (TW)

( * ) Notice: Subject to any disclaimer, the term of this patent is extended or adjusted under 35 U.S.C. 154(b) by 107 days.

(21) Appl. No.: 13/350,043

(22) Filed: Jan. 13, 2012

(65) Prior Publication Data

US 2013/0180411 A1   Jul. 18, 2013

(51) Int. Cl.
   *A47J 37/12* (2006.01)

(52) U.S. Cl.
   USPC ............................................................. 99/404

(58) Field of Classification Search
   USPC .................. 99/404, 405, 406; 198/493, 339.1
   See application file for complete search history.

(56) References Cited

U.S. PATENT DOCUMENTS

| | | | | |
|---|---|---|---|---|
| 3,115,084 A | * | 12/1963 | Anetsberger et al. | 99/352 |
| 4,438,685 A | * | 3/1984 | Haas et al. | 99/342 |
| 4,628,804 A | * | 12/1986 | Belshaw et al. | 99/404 |
| 4,867,049 A | * | 9/1989 | Johnson | 99/330 |
| 4,882,984 A | * | 11/1989 | Eves, II | 99/404 |
| 4,913,042 A | * | 4/1990 | Miller | 99/404 |
| 5,085,137 A | * | 2/1992 | Mottur et al. | 99/404 |
| 5,209,218 A | * | 5/1993 | Daneshvar et al. | 126/374.1 |
| 5,253,567 A | * | 10/1993 | Gunawardena | 99/404 |
| 5,476,034 A | * | 12/1995 | Lygum | 99/403 |
| 5,570,626 A | * | 11/1996 | Vos | 99/404 |

\* cited by examiner

*Primary Examiner* — Henry Yuen
*Assistant Examiner* — John J Norton
(74) *Attorney, Agent, or Firm* — Muncy, Geissler, Olds & Lowe, P.C.

(57) ABSTRACT

A conveying frying machine includes a conveying and frying device and a heat exchange device installed at a lower end thereof. An exhaust chamber is formed between the conveying and frying device and the heat exchange device, and conveyed by the bottom of a shallow oil tank of the conveying and frying device to save disposing space Moreover, a burner is installed on a side of the heat exchange device for heating a heating chamber in the heat exchange device to produce combustion exhaust. The combustion exhaust is passed through a first exhaust end of the exhaust chamber remote from an inlet of the shallow oil tank and discharged from a second exhaust end of the exhaust chamber corresponding to the inlet of the shallow oil tank to heat oil in the shallow oil tank for the second time to stabilize quality to deep fried food and save energy.

8 Claims, 9 Drawing Sheets

CONVEYING FRYING MACHINE

FIELD OF THE INVENTION

The present invention relates to a conveying frying machine, and more particularly to the conveying frying machine having an exhaust chamber formed between a conveying and frying device and a heat exchange device for performing a secondary heating of the shallow oil tank to stabilize the quality of deep fried food and save energy.

BACKGROUND OF THE INVENTION

With reference to FIG. 1 for a conventional conveying frying machine 10, the conveying frying machine 10 comprises a conveying and frying device 11 and a vertical heat exchanger 13, wherein the conveying and frying device 11 includes a shallow oil tank 12 with a height of approximately 30 cm for putting in deep fried food, and the vertical heat exchanger 13 is installed on a side of the conveying and frying device 11, and a burner 130 installed at the bottom of the vertical heat exchanger 13 for heating an internal oil pipe, and an oil outlet pipe 14 installed on a side for inputting oil into the shallow oil tank 12, such that after the oil in the shallow oil tank 12 has been used for frying, the oil is filtered by a filter 15 and discharged from an oil outlet pipe 16 installed on an other opposite position of a side, and the oil is guided into the vertical heat exchanger 13 again for heating. However, during the process of inputting the oil into the shallow oil tank 12 continuously, and the oil temperature at the middle position of the shallow oil tank 12 is more stable, and the oil temperature on both sides of the shallow oil tank 12 may drop easily, and thus the oil temperature in the shallow oil tank 12 is not consistent, and the frying temperature may have a temperature difference ranging from 5° C. to 20° C., and the non-uniform frying temperature may cause an unstable quality of the deep fried food.

Since a burner 130 installed at the bottom of the vertical heat exchanger 13 heats an oil pipe inside the vertical heat exchanger 13, the temperature of a waste gas of combustion discharged during the combustion and heating process generally reaches a temperature up to a range of 500° C. to 550° C., and the waste gas of combustion rises to a chimney 131 installed at the top before the waste gas is discharged, and the combustion temperature of the vertical heat exchanger 13 drops to cause a low efficiency of the combustion heat, and a poor heat exchange.

However, the vertical heat exchanger 13 is installed on a side of the conveying and frying device 11 and the conveying frying machine 10 including the conveying and frying device 11 and the vertical heat exchanger 13 installed on a side of the conveying frying machine 10, so that the connected components incur a larger disposing space.

Further, manufacturers design another conveying frying machine 20 having a horizontal heat exchanger 23 installed on a lateral side of the conveying flying machine 20 as shown in FIG. 2 to improve the aforementioned conveying frying machine 10, wherein deep fried food is put into a shallow oil tank 22 of the conveying and frying device 21, and the conveying and frying device 21 also includes a burner 230 installed from a lateral side to the bottom of the horizontal heat exchanger 23 for heating the interior of the oil pipe, and an oil outlet pipe 24 installed on a lateral side is provided for sending oil into the shallow oil tank 22. After the oil in the shallow oil tank 22 has been used for frying, a filter 25 is provided for filtering the oil, and an oil outlet pipe 26 is installed at an opposite position on the other side for guiding the oil into the horizontal heat exchanger 23 for a secondary heating. In the process of sending oil into the shallow oil tank 22 continuously, the oil temperature at the middle position of the shallow oil tank 22 is more stable, and the oil temperature on both sides of the shallow oil tank 22 may drop easily, so that the oil temperature of the shallow oil tank 22 is inconsistent, and the frying temperature has a temperature difference ranging from 5° C. to 20° C., and thus causing a non-uniform frying temperature and incurring an unstable quality of the deep fried food.

Since the burner 230 installed at the bottom of the horizontal heat exchanger 23 heats the oil pipe inside the horizontal heat exchanger 23, the temperature of the discharged waste gas of combustion reaches a temperature up to a range of 450° C.~500° C. during the combustion and heating process for heating the oil pipe, and the waste gas of combustion rises to a chimney 231 installed at the top, and the waste gas is discharged, and thus the burning temperature of the horizontal heat exchanger 23 drops to cause a low efficiency of the combustion heat and a poor heat exchange.

However, the horizontal heat exchanger 23 is installed at a lateral edge of the conveying and frying device 21, and the conveying frying machine 20 includes the conveying and frying device 21 and the horizontal heat exchanger 23 installed parallel to the lateral edge of the conveying frying machine 20, the connected components incur a larger disposing space.

The conveying frying machine of the present invention is provided for overcoming the aforementioned problems and achieving the effects of saving energy, providing a conveying frying machine without occupying much space, improving the heat efficiency, and maintaining a stable quality of the deep fried food.

SUMMARY OF THE INVENTION

Therefore, it is a primary objective of the present invention to provide a conveying frying machine to improve the conventional frying machine that fails to achieve the required heat efficiency, maintain the stable quality of deep fried food, and save energy. The conveying frying machine comprises an exhaust chamber formed between the conveying and frying device and the heat exchange device, and the exhaust chamber is passed through the bottom of the shallow oil tank of the conveying and frying device, and exhaust of combustion produced by the heat exchange device is passed through a first exhaust end of the exhaust chamber at the bottom of a rear end of the shallow oil tank and then discharged from a second exhaust end of the exhaust chamber at the bottom of a front end of the first exhaust end of the shallow oil tank, for performing a secondary heating of the oil inside the shallow oil tank to stabilize the quality of the deep fried food, so as to achieve the effects of providing a combustion while saving energy.

To achieve the foregoing objective, the present invention provides a conveying frying machine comprising a conveying and frying device and a heat exchange device installed at the bottom of the conveying and frying device.

Since an exhaust chamber is formed between the conveying and frying device and the heat exchange device for guiding the exhaust of combustion, and the exhaust chamber is passed through the bottom of the shallow oil tank of the conveying and frying device, the expected oil temperature of the shallow oil tank can be achieved to perform a secondary heating of the shallow oil tank. A shallow oil tank having a height of approximately 30 cm is provided for putting in approximately 10 cm of oil, so that the oil of the shallow oil tank is fully heated.

The conveying and frying device includes a shallow oil tank, an oil filter installed on an external side of the conveying and frying device, and a starting module coupled to the oil filter, and the shallow oil tank has an inlet formed at an end of the shallow oil tank for putting in deep fried food, and the shallow oil tank includes a first conveyor belt at the other end of the shallow oil tank for pressing and guiding the deep fried food to move forward, and the second conveyor belt on the external side at the other end is provided for outputting the deep fried food, and the heat exchange device includes a heating chamber having an oil pipe and a burner disposed on an internal side and interconnected to the heating chamber.

DETAILED DESCRIPTION OF THE PREFERRED EMBODIMENTS

The technical contents of the invention will now be described in more detail hereinafter with reference to the accompanying drawings that show various embodiments of the invention.

Figure 1:
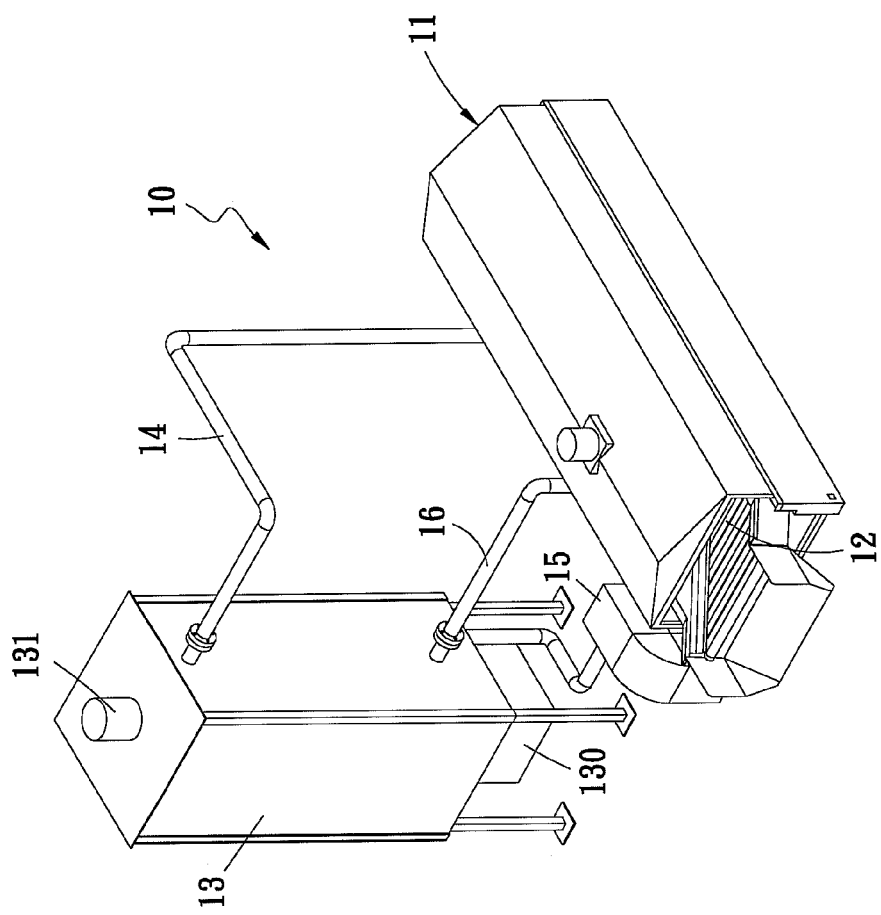
FIG. 1 is a perspective view of a conventional frying machine.
Figure 2:
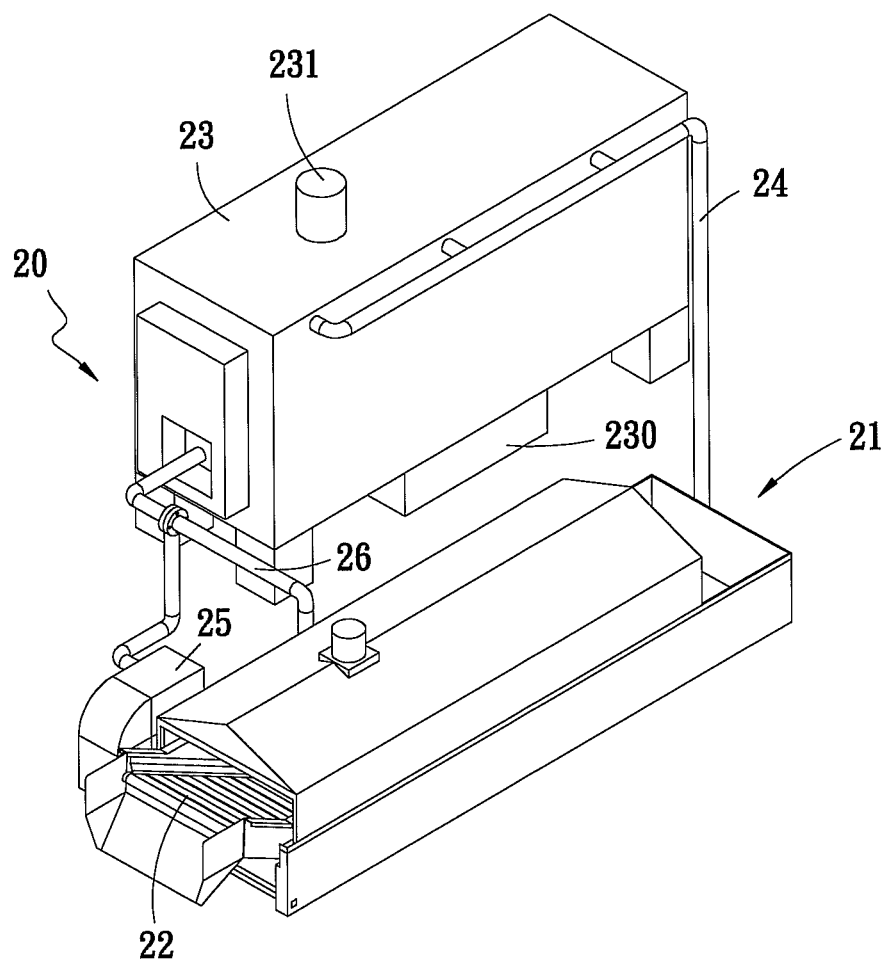
FIG. 2 is a perspective view of another conventional frying machine.
Figure 3:
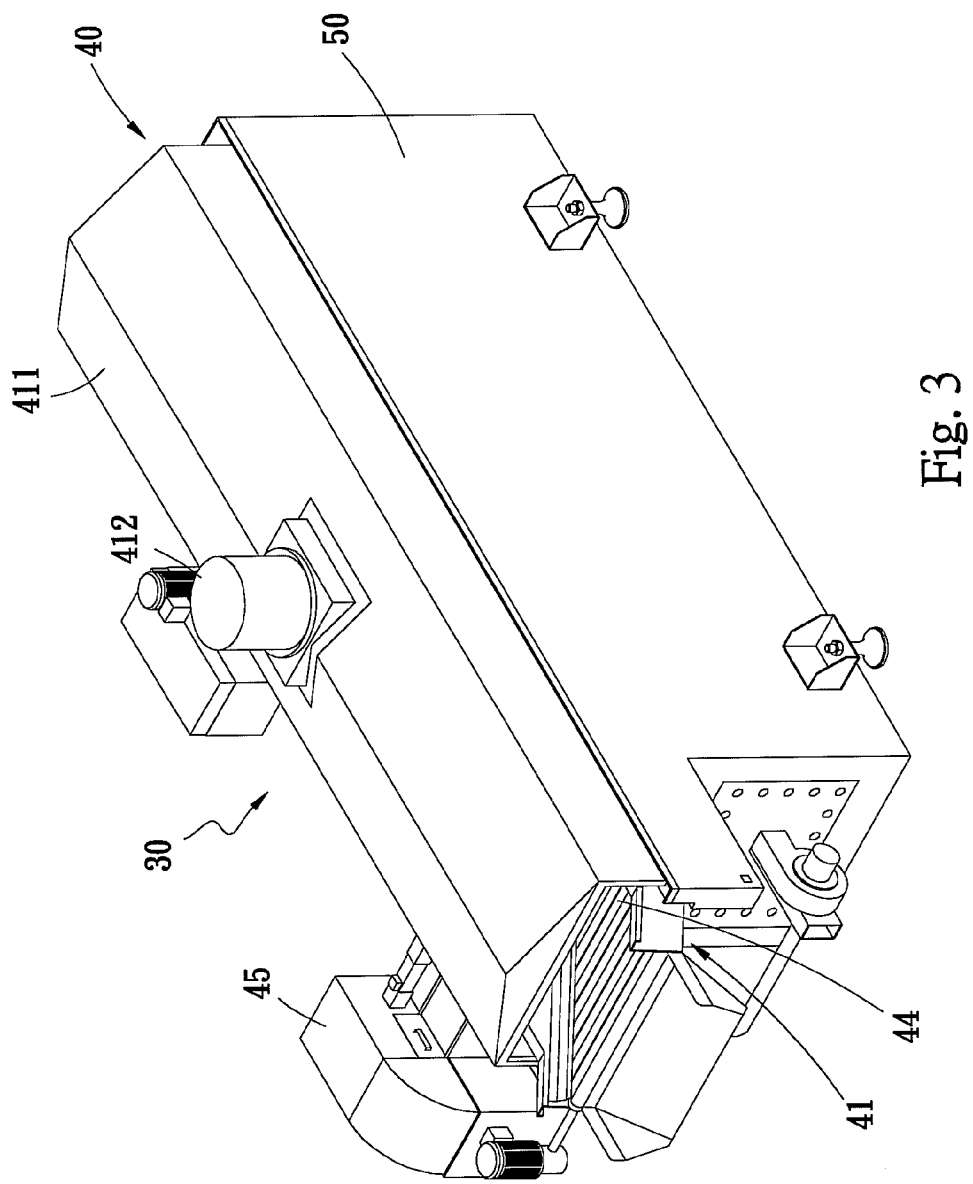
FIG. 3 is a perspective view of a conveying frying machine of the present invention.
Figure 4:
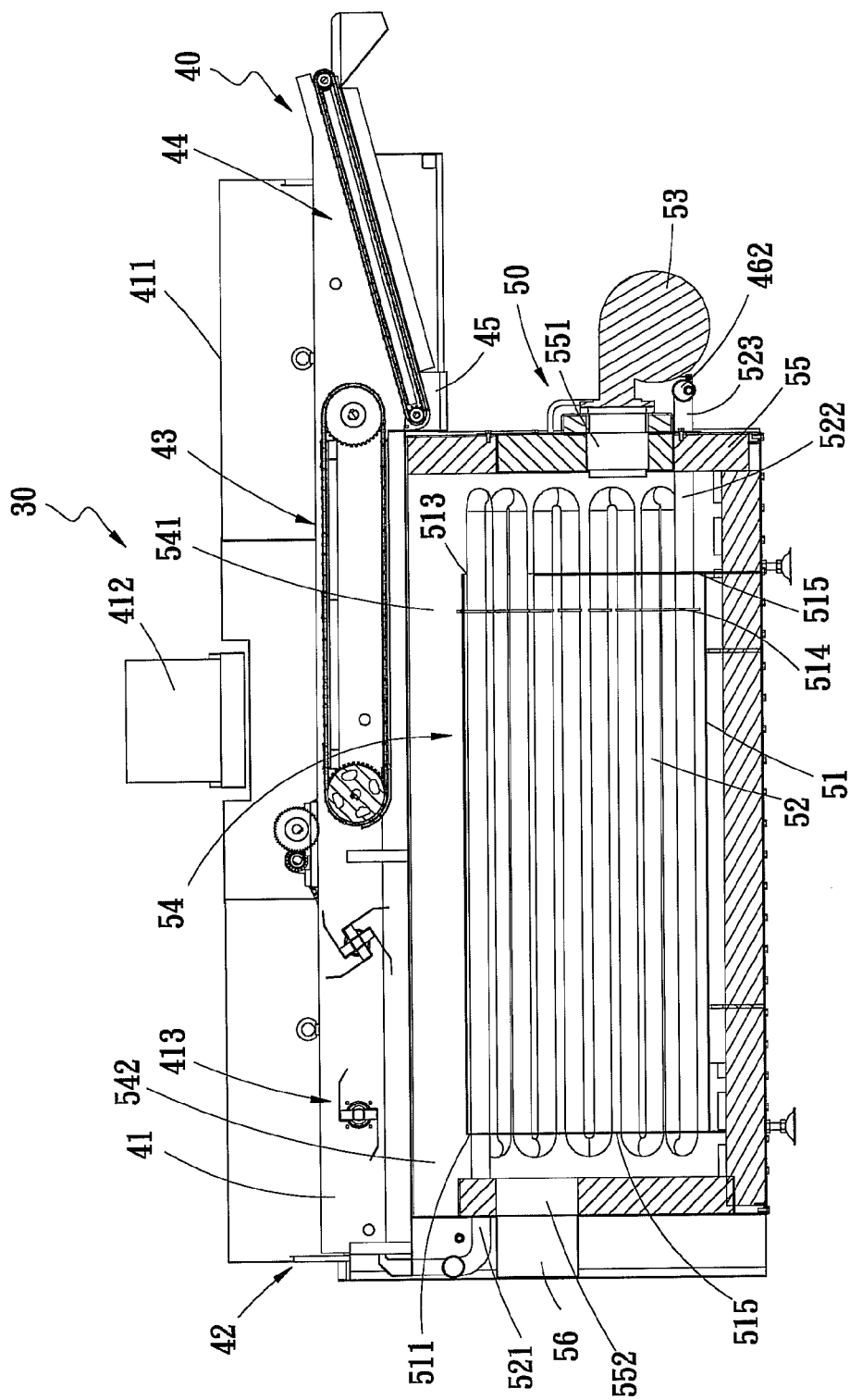
FIG. 4 is a side view of a conveying flying machine of the present invention.
Figure 5:
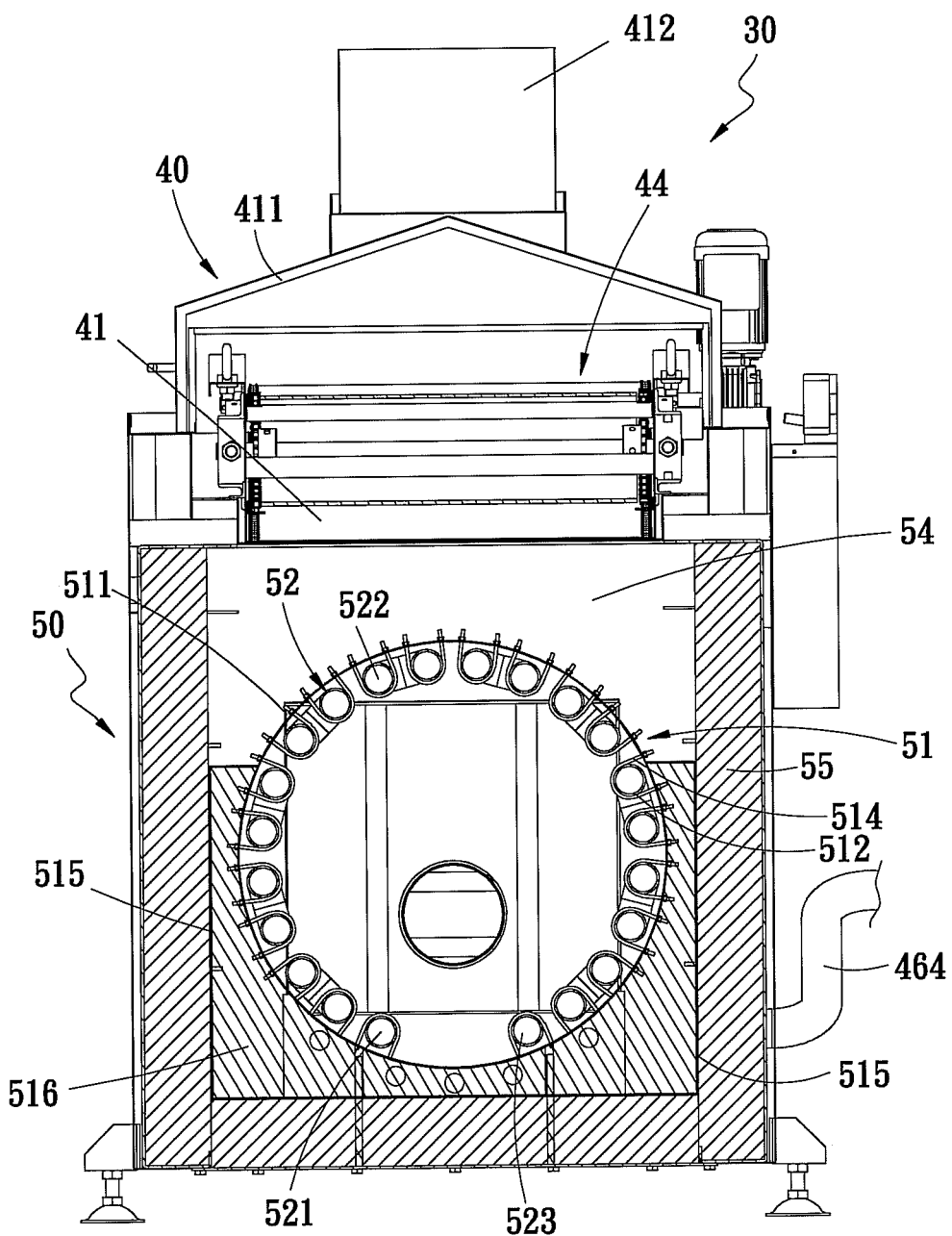
FIG. 5 is a font cross-sectional view of a conveying frying machine of the present invention.

With reference to FIGS. 3 and 4, 5 for a conveying frying machine 30 in accordance with a preferred embodiment of the present invention, the conveying frying machine 30 comprises a conveying and frying device 40 having a shallow oil tank 41 that contains oil, a heat exchange device 50 installed under the shallow oil tank 41 for heating the conveying and frying device 40. An exhaust chamber 54 is formed between the conveying and frying device 40 and the heat exchange device 50. The exhaust chamber 54 is passed through the bottom of the shallow oil tank 41 of the conveying and frying device 40 for performing a secondary heating of the shallow oil tank 41.

The conveying and frying device 40 includes a shallow oil tank 41, an oil filter 45 disposed on an external side for filtering the oil, and a starting module 46 coupled to the oil filter 45.

With reference to FIGS. 4 and 5, the shallow oil tank 41 includes an upper lid 411 installed at the top thereof, and an oil and gas exhaust pipe 412 installed at the top of the upper lid 411, and the shallow oil tank 41 has a height of approximately 30 cm and contains approximately 10 cm of oil, and the shallow oil tank 41 has an inlet 42 formed at an end of the shallow oil tank 41 for putting in deep fried food (not shown in the figure), and the shallow oil tank 41 includes a plurality of stirring members 413 installed at the top thereof for stirring deep fried food, a first conveyor belt 43 installed at the other end of the shallow oil tank 41 for pressing and guiding the deep fried food to move forward, and a second conveyor belt 44 installed on an external side at the other end for outputting the deep fried food. The stirring member 413 and the first conveyor belt 43 can be installed according to the design for the stirring and conveying of the product.

Figure 6:
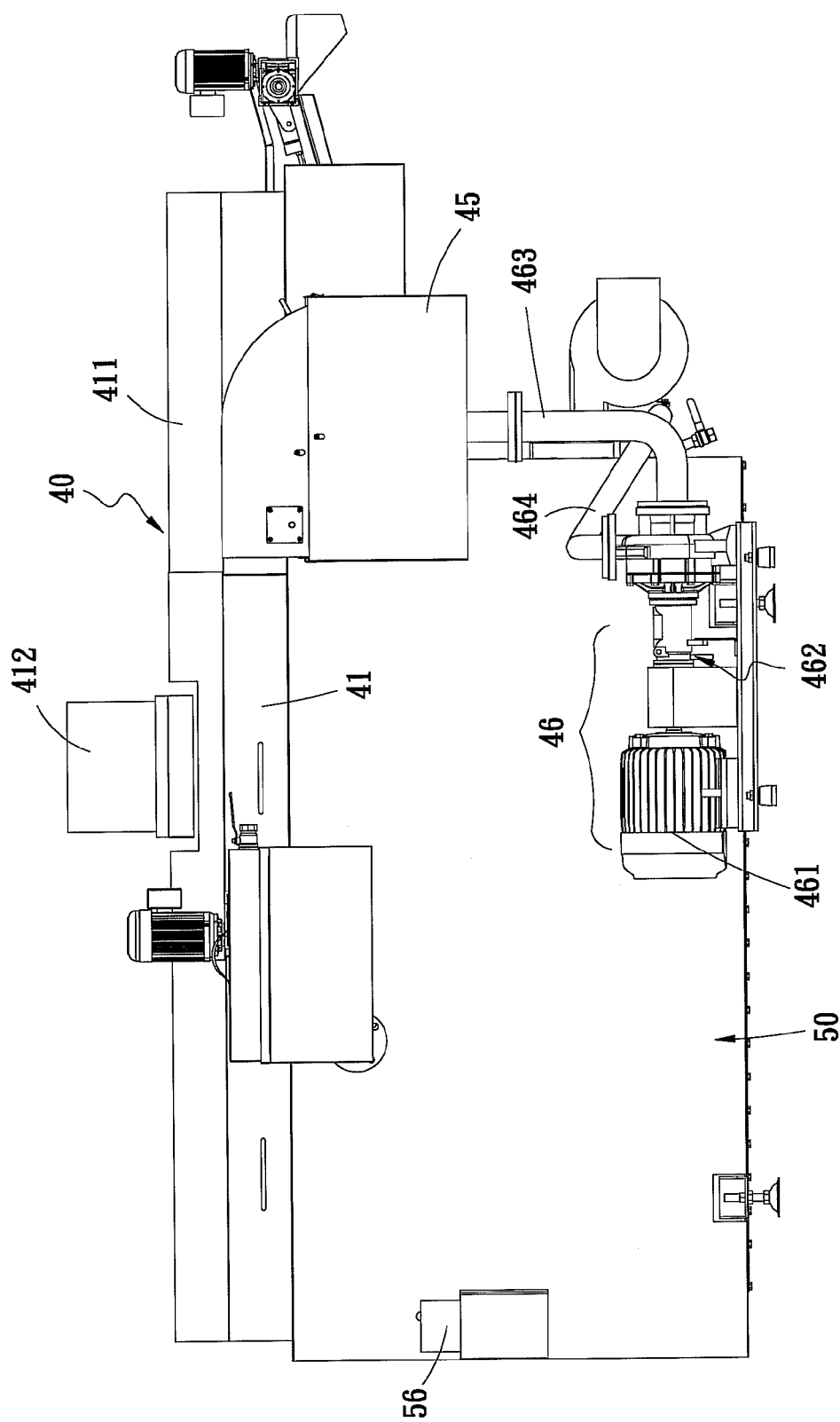
FIG. 6 is a side view of a conveying frying machine of the present invention.
Figure 7:
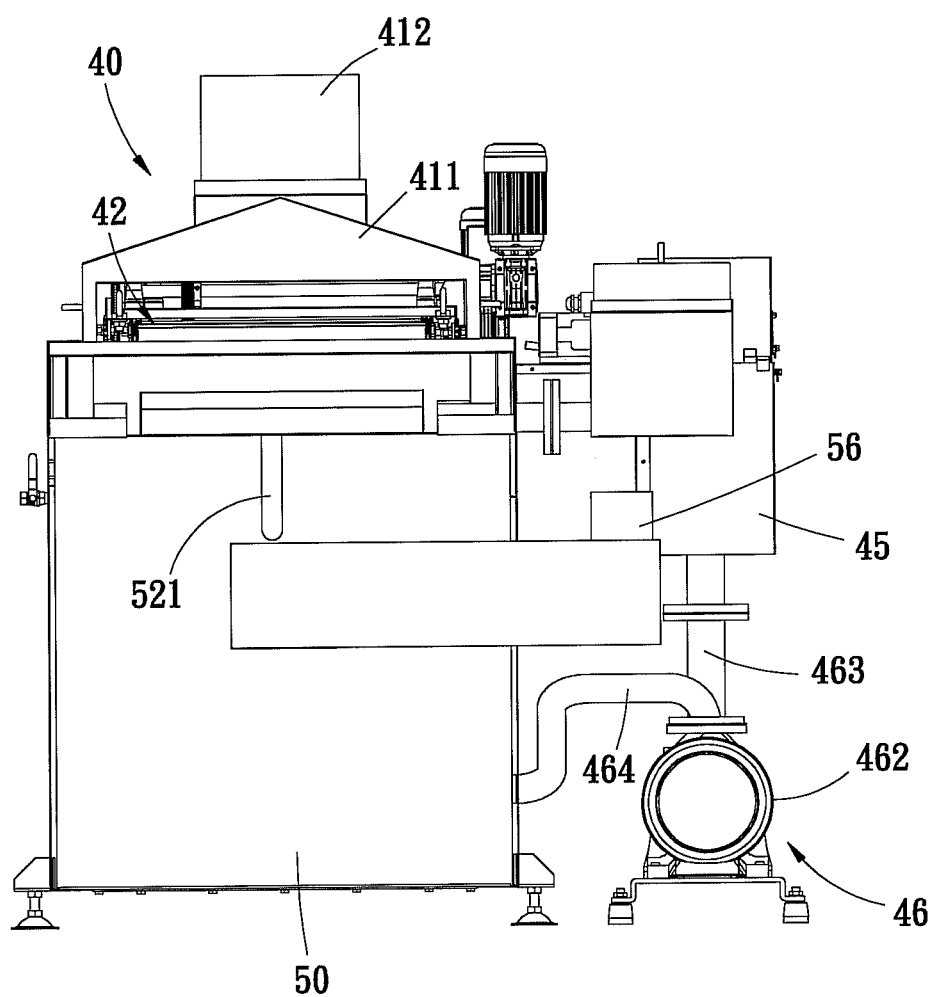
FIG. 7 is a front view of a conveying frying machine of the present invention.

With reference to FIGS. 6 and 7 for the oil filter 45 for filtering the fried oil of shallow oil tank 41, so that the filtered oil can be sent from the heat exchange device 50 back into the shallow oil tank 41.

Figure 8:
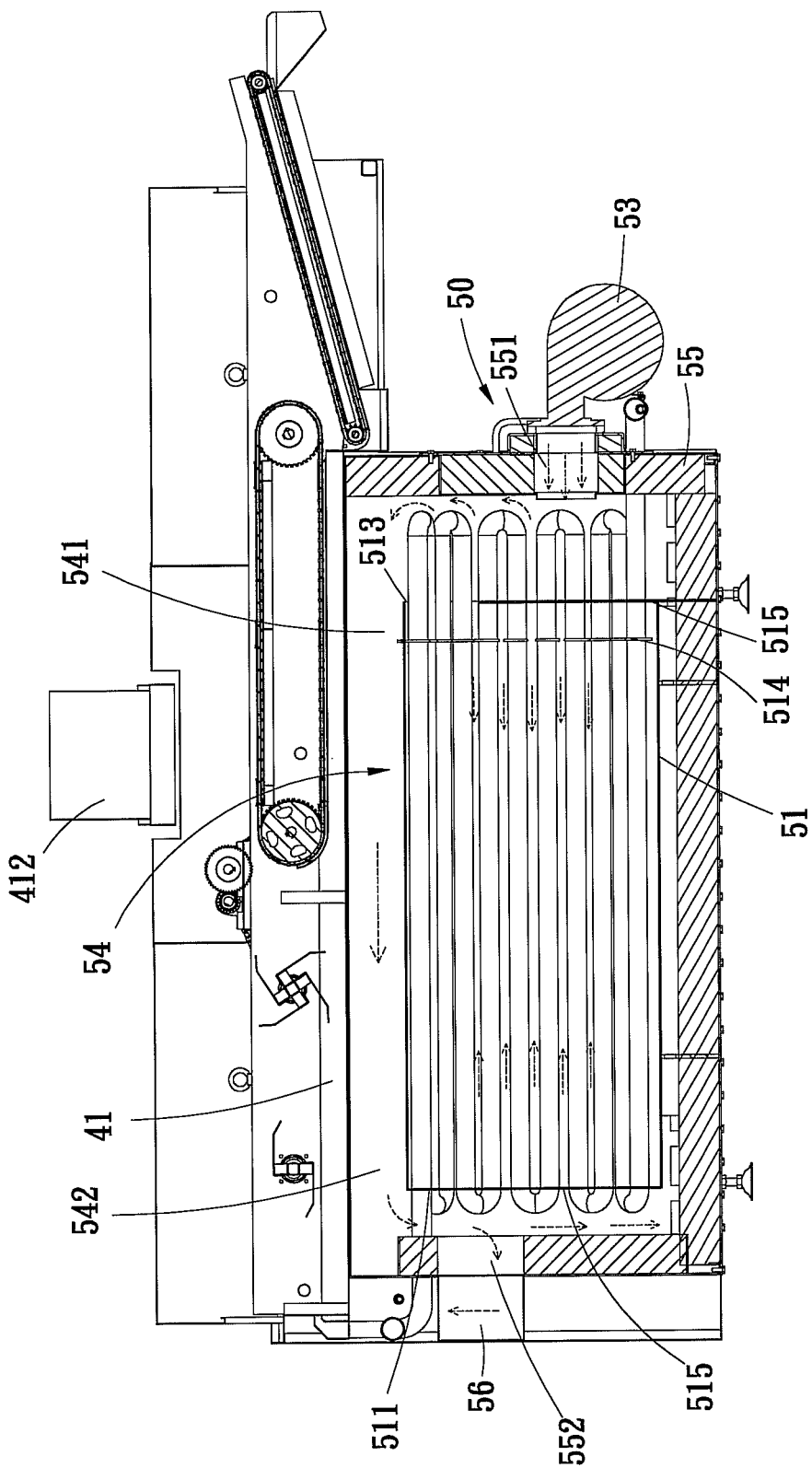
FIG. 8 is a schematic view of discharging exhaust of combustion from a conveying frying machine of the present invention.

With reference to FIGS. 6 to 8, the starting module 46 is installed at a bottom end of the oil filter 45 and includes a pipeline 463 coupled to the oil filter 45, and another pipeline 464 coupled to a side of the heat exchange device 50. The starting module 46 also includes a motor 461 and a pump 462 driven and operated by the motor 461.

The heat exchange device 50 includes a heating chamber 51 having an oil pipe 52, a burner 53 installed on an external side and interconnected to the heating chamber 51, and an insulation material 55 disposed on an external periphery for preserving the temperature of the heat exchange device 50, and a first opening 551 is formed at an end of the insulation material 55, and a second opening 552 is formed at the other opposite end of the insulation material 55.

In FIGS. 4 and 5, the heating chamber 51 is substantially in form of a barrel with a sealed bottom 511 at an end, and the sealed bottom 511 has a plurality of through holes 512 formed at positions proximate to and around the external circumference, and an open portion 513 is disposed at the other end and interconnected to a hollow interior, and a plurality of through holes 512 is formed at positions proximate to and around the open portion 513 and corresponding to the plurality of support members 514, and a partition plate 515 having an insulation material 516 is installed at an external periphery of a lower section of the heating chamber 51, so that the exhaust of combustion of the heating chamber 51 can be sent from the top.

In FIGS. 4, 5 and, the oil pipe 52 has an oil outlet 521 formed at one end of the oil pipe 52. The oil outlet 521 couples to an inlet 42 at an end of the shallow oil tank 41, and the other end 522 of the oil pipe 52 is continuously bent, extended and passed through the plurality of through holes 512 of the sealed bottom 511 and each support member 514 is bent and coupled, such that the other end 522 of the oil pipe 52 is protruded from the open portion 513, and supported by each support member 514 to prevent a pipe wall of the oil pipe 52 from being cracked during the heating process, and an oil inlet 523 at the other end 522 is coupled to a pump 462, and the pump 462 is provided for pumping oil and inputting the oil from the oil inlet 523.

In FIGS. 4 and 5, the burner 53 has a burning surface aligned towards the first opening 551 formed at an end of the insulation material 55 of the heat exchange device 50 for heating the heating chamber 51, and the heating chamber 51 includes a burner 53 installed therein for heating the exhaust of combustion. The exhaust is discharged from the first exhaust end 541 and the second exhaust end 542 of the exhaust chamber 54 between the conveying and frying device 40 and the heat exchange device 50 to the second opening 552 at the other end of the insulation material 55, and finally discharged from the exhaust pipe 56, so that the exhaust of combustion can be used for performing a secondary heating of the oil in the shallow oil tank 41, and the oil in the shallow oil tank 41 can be fully heated to achieve the effects of saving energy and providing a high combustion efficiency.

On the other hand, the heat exchange device 50 is installed at the lower end of the shallow oil tank 41 of the conveying and frying device 40, and the exhaust of combustion produced by the heat exchange device 50 is discharged from the first exhaust end 541 of the exhaust chamber 54 at the bottom of the rear end of the shallow oil tank 41, and then discharged from the first exhaust end 541 to the second exhaust end 542 of the exhaust chamber 54 at the bottom of the front end of the shallow oil tank 41 for performing a secondary heating of the oil in the shallow oil tank 41, such that the oil temperature at the inlet 42 of the shallow oil tank 41 is very close to the oil temperature at the outlet to reduce the temperature difference between the front and rear ends of the shallow oil tank 41, so as to provide a uniform and stable temperature for the shallow oil tank 41.

Figure 9:
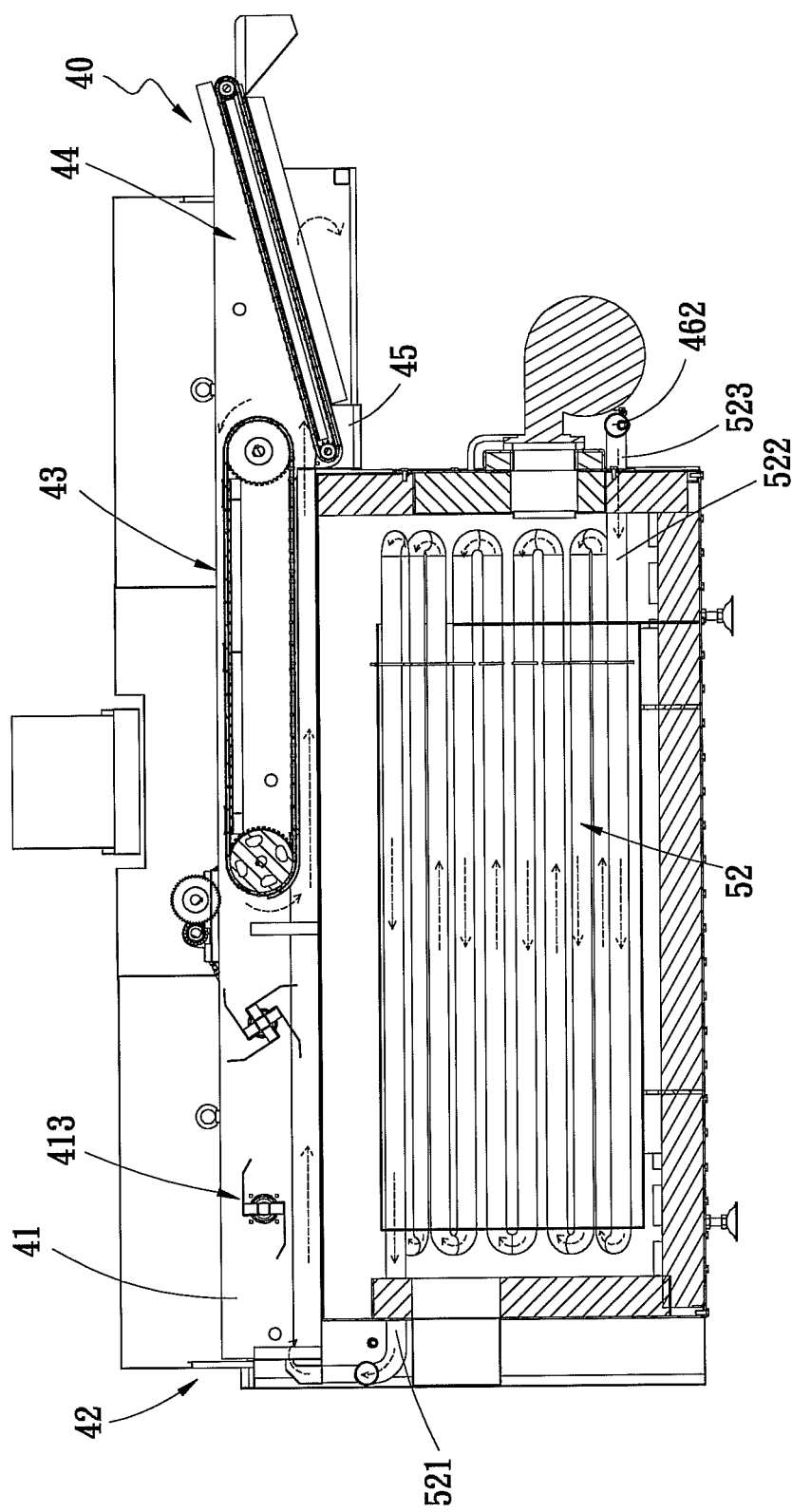
FIG. 9 is a schematic view of an oil flow of an oil pipe of a conveying frying machine of the present invention.

In FIGS. 6, 7 and 9, the aforementioned conveying frying machine 30 starts the motor 461 to drive the pump 462 and starts the burner 53 to ignite for combustions after the shallow oil tank 41 is filled up with oil, and heats the heating chamber 51. After the oil in the shallow oil tank 41 is heated, the deep fried food is putted into the shallow oil tank 41, and the stirring member 413 is provided for stirring the deep fried food. The first conveyor belt 43 at the other end is provided for pressing and guiding the deep fried food to move forward, but the deep fried food will not bounce, and finally the deep fried food is fried and outputted by the second conveyor belt 44 installed on an internal side of the other end.

In FIG. 8, the burner 53 installed inside the heating chamber 51 is provided for heating exhaust of combustion through the first opening 551, and the exhaust of combustion (indicated by the dotted line in FIG. 8) flows from the top of the open portion 513 of the heating chamber 51 and towards the first exhaust end 541 of the exhaust chamber 54 at the bottom of the rear end of the shallow oil tank 41, and the exhaust is discharged from the first exhaust end 541 through the second exhaust end 542 of the exhaust chamber 54 at the bottom of the front end of the shallow oil tank 41, and guided into the second opening 552 at the other end of the insulation material 55, and finally discharged from the exhaust pipe 56, so that the exhaust of combustion will rise and contact with the shallow oil tank 41 again to perform a secondary heating of the oil in the shallow oil tank 41, and the smoke of the oil in the shallow oil tank 41 is discharged from the oil and gas discharge pipe 412. Therefore, the oil in the shallow oil tank 41 can be fully heated, and the exhaust of combustion and the oil can achieve an excellent heat exchange to improve the heat efficiency and save energy.

Since the conveying frying machine 30 of the aforementioned embodiment includes the heat exchange device 50 installed at the bottom end of the conveying and flying device 40 to reduce the occupied space, therefore the conveying and frying device 40 and the heat exchange device 50 can be installed on top of one another to save the space and fully utilize the exhaust of combustion produced by the heat exchange device 50 for a secondary heating of the oil in the shallow oil tank 41. Therefore, the invention can achieve the effects of occupying not much space and lowering the manufacturing cost.

Obviously, the present invention improves over the prior art and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A conveying frying machine, comprising:
a conveying and frying device including a shallow oil tank at the bottom thereof, the shallow oil tank including an inlet for putting in deep fried food and an outlet opposite to the inlet; and
a heat exchange device which is located below the conveying and frying device and includes a heating chamber having an oil pipe inside, a burner which is installed on a lateral side of the heat exchange device and communicates with the heating chamber, a bottom at another lateral side of the heat exchange device remote from the burner and an open portion at a top side thereof adjacent to the burner and communicating with an interior of the heating chamber for combustion exhaust produced by the burner to discharge, the oil pipe including an oil inlet to receive oil from the outlet of the shallow oil tank and an oil outlet remote from the open portion and running through the bottom to connect to the inlet of the shallow oil tank;
wherein an exhaust chamber is formed between the conveying and frying device and the heat exchange device to be correspondingly covered by the bottom of the shallow oil tank of the conveying and frying device, the combustion exhaust produced by the burner is discharged from the heating chamber to the exhaust chamber through the opening portion, and flows from a first exhaust end of the exhaust chamber corresponding to the outlet of the shallow oil tank to a second exhaust end of the exhaust chamber corresponding go the inlet of the shallow oil tank to contact the shallow oil tank so that oil of the shallow oil tank is heated by the combustion exhaust with different temperatures to balance oil temperature inside the overall shallow oil tank and stabilize the quality of the deep fried food for saving energy.

2. The conveying frying machine of claim 1, wherein the shallow oil tank includes a first conveyor belt for pressing, sending and guiding the deep fried food to move forward, and a second conveyor belt for outputting the deep fried food.

3. The conveying frying machine of claim 1, wherein the conveying and frying device includes an oil filter installed on an external side of the shallow oil tank for receiving the oil from the outlet of the shallow oil tank and filtering the oil, and a driving module connected to the oil filter through a pipeline and connected to the oil inlet of the oil pipe through another pipeline, and wherein the driving module includes a motor and a pump driven by the motor.

4. The conveying frying machine of claim 1, wherein the shallow oil tank has a height of approximately 30 cm.

5. The conveying frying machine of claim 1, the bottom includes a plurality of through holes disposed at positions proximate to the external circumference, the heating chamber includes a plurality of support members corresponding to the through holes and disposed at positions proximate to and around the open portion, and a partition plate having an insulation material and disposed at an external periphery of the heating chamber.

6. The conveying frying machine of claim 5, wherein the oil pipe is curved and extended continuously to pass through the plurality of through holes of the bottom, and each support member is bent and coupled, so that the other end of the oil pipe protruded from the open portion is supported by each support member.

7. The conveying frying machine of claim 1, wherein the heat exchange device includes an insulation material disposed at the external periphery of the heat exchange device, and a first opening is formed at an end of the insulation material to connect with the burner, and a second opening and an exhaust pipe are disposed on the other opposite end of the insulation material.

8. The conveying frying machine of claim 7, wherein the burner has a burning surface aligned towards the first opening at an end of the insulation material of the heat exchange device for heating the heating chamber.

\* \* \* \* \*